(12) United States Patent
Zhao

(10) Patent No.: US 11,064,245 B1
(45) Date of Patent: Jul. 13, 2021

(54) PIECEWISE HYBRID VIDEO AND AUDIO SYNCHRONIZATION

(71) Applicant: VIDEOLOCALIZE INC., Toronto (CA)

(72) Inventor: Jie Zhao, Unionville (CA)

(73) Assignee: VIDEOLOCALIZE INC., Toronto (CA)

( * ) Notice: Subject to any disclaimer, the term of this patent is extended or adjusted under 35 U.S.C. 154(b) by 0 days.

(21) Appl. No.: 16/768,689

(22) PCT Filed: Aug. 13, 2019

(86) PCT No.: PCT/CA2019/000117
§ 371 (c)(1),
(2) Date: May 31, 2020

(87) PCT Pub. No.: WO2020/069594
PCT Pub. Date: Apr. 9, 2020

Related U.S. Application Data

(60) Provisional application No. 62/740,463, filed on Mar. 10, 2018.

(51) Int. Cl.
| | | |
|---|---|---|
| *H04N 21/43* | (2011.01) | |
| *H04N 21/81* | (2011.01) | |
| *H04N 21/439* | (2011.01) | |
| *G06N 3/04* | (2006.01) | |
| *H04N 21/466* | (2011.01) | |

(52) U.S. Cl.
CPC ......... *H04N 21/43072* (2020.08); *G06N 3/04* (2013.01); *H04N 21/439* (2013.01); *H04N 21/4666* (2013.01); *H04N 21/8106* (2013.01)

(58) Field of Classification Search
CPC ......... H04N 21/43072; H04N 21/4666; H04N 21/8106; H04N 21/439
USPC ......................................................... 348/515
See application file for complete search history.

(56) References Cited

U.S. PATENT DOCUMENTS

| | | | | |
|---|---|---|---|---|
| 5,477,542 A | * | 12/1995 | Takahara | H04J 3/177 348/14.05 |
| 6,292,834 B1 | * | 9/2001 | Ravi | H04L 29/06027 375/E7.004 |
| 7,224,837 B2 | * | 5/2007 | Olshansky | H04N 21/2365 348/423.1 |

(Continued)

*Primary Examiner* — Michael B. Pierorazio

(57) ABSTRACT

The present disclosure provides a method and apparatus for automatically synchronizing a first stream of media data with a second, and outputting a third by decoding the streams into channels, splitting the channels into a plurality of piecewise segments defined by control points that the control points with the same index are to be synchronized in time across all the channels, automatically and intelligently adjusting the length of the media data in each segment in an optimal and hybrid manner using a linear or non-linear digital signal processing algorithm, synchronizing and mixing all the processed segments, and outputting the final mixed and encoded data stream. Specifically, one of the media data is video and the other is audio or a translation voice in a different language. With a controlled minimized distortion, one can achieve faster post-processing speed and optimal synchronization quality, therefore save both time and cost for video language localization services.

20 Claims, 8 Drawing Sheets

(56) References Cited

U.S. PATENT DOCUMENTS

| | | | | |
|---|---|---|---|---|
| 7,237,251 | B1* | 6/2007 | Oz | H04N 21/8166 |
| | | | | 725/40 |
| 7,571,246 | B2* | 8/2009 | Virdi | H04N 21/23611 |
| | | | | 709/232 |
| 7,961,792 | B2* | 6/2011 | Maertens | H04N 21/4307 |
| | | | | 375/240.26 |
| 8,023,511 | B2* | 9/2011 | Komiya | H04Q 11/0067 |
| | | | | 370/390 |
| 8,249,141 | B1* | 8/2012 | Harris | H04N 21/8455 |
| | | | | 375/240.01 |
| 8,380,790 | B2* | 2/2013 | Lee | H04L 12/1827 |
| | | | | 709/205 |
| 8,925,021 | B2* | 12/2014 | Ma | H04L 67/02 |
| | | | | 725/90 |
| 8,990,351 | B2* | 3/2015 | Isaksson | H04L 47/30 |
| | | | | 709/219 |
| 9,106,787 | B1* | 8/2015 | Holmer | H04L 47/2416 |
| 9,226,022 | B2* | 12/2015 | Ferguson | H04N 21/44016 |
| 10,503,460 | B2* | 12/2019 | Becker | G06F 3/16 |
| 10,506,295 | B2* | 12/2019 | Chen | H04N 21/233 |
| 10,757,466 | B2* | 8/2020 | Lau | H04N 21/8106 |
| 2008/0260350 | A1* | 10/2008 | Cooper | H04N 5/04 |
| | | | | 386/248 |
| 2013/0014156 | A1* | 1/2013 | Seo | H04N 21/4384 |
| | | | | 725/32 |
| 2018/0139496 | A1* | 5/2018 | Gustafsson | H04N 21/23418 |
| 2019/0335209 | A1* | 10/2019 | Birrer | H04N 21/234 |

* cited by examiner

PIECEWISE HYBRID VIDEO AND AUDIO SYNCHRONIZATION

CROSS-REFERENCE TO RELATED APPLICATIONS

This application is a national stage application, filed under 35 U.S.C. § 371, of International Patent Application No. PCT/CA2019/000117, Publication No. WO2020069594, priority date inherited is Oct. 3, 2018, filed on Aug. 13, 2019, which is incorporated by reference herein in its entirety.

FIELD

The present disclosure is in the field of video and audio synchronization, audio dubbing, and voice-over translation. More particularly, the present disclosure relates to a method and system for synchronizing source video and its translated multilingual voice-over as well as music and sound effects.

BACKGROUND

Voice-over translation and voice dubbing are common ways to localize a video for languages other than the original source language. With voice-over translation, a new voice is added on top of the existing audio track that includes the original voice and can be heard in the background. With voice dubbing, a new audio track is created to replace the existing one. The new audio track combines the new voice with the original background music and sound effects. Either way, a new voice needs to be recorded and processed.

Before the recording, each sentence in the source language needs to be translated into the target language and acted by an actor or actress. Due to the acting and language differences, the voice length (duration) of each sentence in the target language is usually different from that in the original language. This causes the new voice to be out of sync with the original sound effects, music, and/or other visual content. For example, the new voice may continue after the character's mouth is closed; or an exploding sound effect happens after people start to scream. Audio-to-video (AV) synchronization refers to the relative timing of audio (sound) and video (image) components during creation, post-production (mixing), transmission, reception, and playback processing. AV synchronization can be an issue in television, video conferencing, and film industries. The sync error is expressed as the amount of time the audio departs from perfect synchronization with the video, where a positive time number indicates the audio leads the video, and a negative number indicates the audio lags behind the video.

Existing methods to match the new voice with the original voice and/or audio-visual content often require high costs and lengthy processes. The most common method used in dubbing is to record new sentences to match the playing video based on trial and error. The repetition and consumed time in vocal acting can introduce huge costs in production. Another method is to manually adjust each new audio to match the corresponding video content. This requires human to make every decision on the synchronization enter and exit points, the video and audio matching events, and manually adjust the audio length through trimming, retiming, or tone changing. The process is tedious and often very difficult if not impossible. Therefore, there is a need for a better and more cost-effective method, with a system to synchronize two media data, especially audio and voice, to the video automatically.

SUMMARY

The present disclosure discusses methods of generating synchronized media from digital input data with a number of channels, comprising: determining a same number of thresholds, one for each of the channels; identifying a plurality of control points indexed in chronological order, excluding the beginning point, within each channel, wherein the content at a control point within a channel is to be synchronized with the content at the control point with the same index within each of the other channels based on the data content; using each channel's control points to partition it into a same plurality of piecewise segments so that each segment starts and ends at a control point except for the first segment, which starts at the beginning point and ends at the first control point; applying a first algorithm to determine a same plurality of target lengths, one for all segments with the same index across all channels, as well as a set of parameters for each segment; applying a second algorithm to modify the data of each segment to match the target length, using the segment's set of parameters; regenerating each channel by joining the modified segments in order; wherein the content at each control point within any channel occurs at the same time as that across all other channels during media playback; wherein the content anywhere within all channels is perceived to be synchronized; wherein the perceived quality difference between the modified and input channels is within the threshold.

The present disclosure also describes an apparatus for synchronizing at least a first stream of media data with a second and outputting a third, comprising: a decoder that decodes a video channel and a first audio channel from the first stream of media data and a second audio channel from the second stream of media data; a control module that stores settings and parameters and determines thresholds; a processor that identifies at least a first and second control point within each of three channels, which are the video, first audio, and second audio channels; wherein all the first control points are to be synchronized in time across all the channels; so are all the second control points; wherein the processor partitions each of the three channels into at least a first and second piecewise segment, wherein the first segment starts at the channel's beginning point and ends at the channel's first control point; the second segment starts at the channel's first control point and ends at the channel's second control point; wherein the processor uses an algorithm to determine a first target length for all the first segments across all channels; and a second target length for all the second segments across all channels; as well as a set of parameters for each of the segments; a video processor that modifies each video segment to match the target length with the set of parameters and settings, joins all segments, and generates a processed video channel; an audio processor that modifies each audio segment to match the target length with the set of parameters and settings, joins all segments, and mixes the synchronized first and second audio channels into a processed audio channel; an encoder encodes the processed video and audio channels into the third stream of media data. wherein the content at each control point within any channel occurs at the same time as that across all other channels during media playback; wherein the content anywhere within all channels is perceived to be synchronized; wherein the perceived quality difference between the modified and original channels is within the threshold.

All decisions and processing are carried out automatically and intelligently with or without artificial intelligence algorithms and software; therefore, with a controlled negligible distortion, one can achieve much better synchronization quality and faster post-processing speed to save both time and cost for video language localization services.

DETAILED DESCRIPTION

Figure 1:
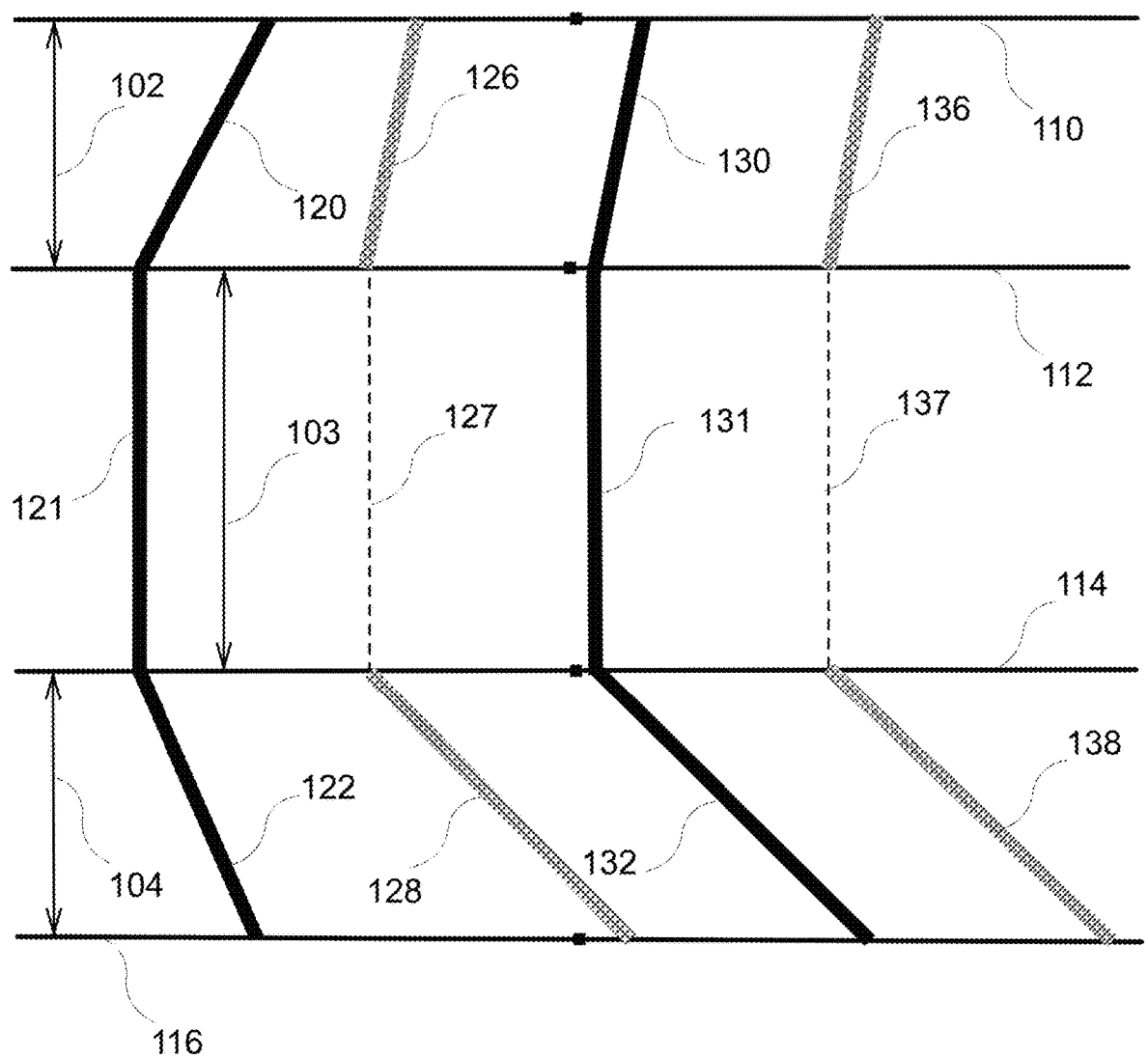
FIG. 1 illustrates a basic exemplary embodiment of the piecewise video and audio synchronization method of the present disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one ordinarily skilled in the art that the present invention may be practiced without these specific details. The present disclosure is to be considered as an exemplification of the invention, and is not intended to limit the invention to the specific embodiments illustrated by the figures or description below. The present invention will now be described by referencing the appended figures representing preferred or alternative embodiments.

The present disclosure describes a new method for automatically synchronizing at least two streams of input media data, typically one video and one audio. However, it can also be two video data or two audio data. Both video and audio data are functions of time. It should be noted that the two-input media are not necessarily of the same length in time.

A perfect video and audio synchronization mean that any signal sample of the audio happens exactly at the desired point of time with the matching video frame. Recording both video and audio at the same time usually ensures a native AV synchronization. If the audio and video have to be recorded separately, there must be a way to synchronize them during the post-production stage. Normally, clapboard is used. The clap is used to synchronize the audio, and the board is used to synchronize the video frames.

However, by identifying the clap locations in audio and/or board frames in video, one can only shift the audio and video segment in time. If the audio length is too short or too long for the video, the audio cannot sync with the video no matter how much it is shifted. To change the digital audio length, one has to raise or lower the tempo, pitch, or both pitch and tempo of the sound. To change the digital video length, also called retiming, one has to interpolate or down-sample video frames. By combining the methods of adjusting media length and shifting the starting location, one can make any medium synchronize to another.

The present disclosure discusses methods for synchronizing a first input media data to a second input media data, comprising: (1) splitting the first media data into a plurality of piecewise segments; (2) splitting the second media data into the same number of piecewise segments; (3) in each segment, determining which media data to be adjusted with help from a machine learning model; (4) adjusting the length of said media data to match the other media data in each segment; (5) connecting all the segments of each media data; and (6) outputting the final synchronized media data; especially if one of the media data is video and the other is audio or translated voice. All decisions and processing are carried out automatically through software; therefore, with a controlled slight media distortion, one can achieve much better media synchronization quality and faster post-processing speed, saving both time and money on the video language localization work.

FIG. 1 illustrates a basic exemplary embodiment of the piecewise video and audio synchronization method of the present disclosure. The thick black line on the left side represents a first input media data; and the thick hatched line on the left side represents a second input media data. Each input media data can be, but is not limited to, either video or audio data, where audio data can be, but is not limited to, either a voice-over in one of the translation languages or the background music and sound effects. This applies to all the following figures. In one of the basic embodiments of the present disclosure, the thick black line is a video; and the thick hatched line is a translation voice-over audio in the target language. As shown in FIG. 1, the input video data is split into three piecewise segments (120, 121, 122) defined by pairs of common control points (110, 112, 114, 116). The input voice is also split into three piecewise segments (126, 127, 128), wherein the segment (127) is silence, and the segments (126) and (128) each contains a translated sentence. The audio segments are defined by the same pairs of common control points (110, 112, 114, 116) as of the video segments (120, 121, 122). The first video and audio common segment (102) begins at common control point (110), or called common control line interchangeably, and ends at common control point (112). The second video and audio common segment (103) begins at common control line (112) and ends at common control line (114). The third video and audio common segment (104) begins at common control line (114) and ends at common control line (116). The goal is to synchronize the video and voice in the first pair of common control points (110 and 112) and the second pair of points (114 and 116). As segment (127) is silence, no synchronization needs to be done for the corresponding time interval. In this embodiment example of the present disclosure, media segment (120) is longer than media segment (126) and media segment (122) is shorter than media segment (128). In reality, any media segment length combination is possible.

The thick black line (130) on the right side represents the first output media data that is processed from the first input media data (120); and the thick hatched line (132) on the right side represents the second output media data that is processed from the second input media data (122). Each output media data can be, but is not limited to, either video or audio data, where audio data can be, but is not limited to, either a voice-over in one of the translated languages or the background music and sound effects. In one of the preferred embodiments of the present disclosure, the thick black line (130, 132) is the synchronized video; and the thick hatched line (136, 138) is the translation voice-over in the target language. In this embodiment of the present disclosure, the first video segment (120) has been adjusted in length to become the synchronized segment (130), which has the same length as the voice segment (136). Likewise, the second video segment (122) has been adjusted in length to become the synchronized segment (132), which has the same length as the voice segment (138). Segment (131) remains unchanged from segment (121) because there is no new voice to synchronize to. The voice segments (136, 137, 138) remain unchanged from segments (126, 127, 128) respectively because none of the voice media data are altered in this exemplary design embodiment of the present disclosure. In one embodiment of the present disclosure, the video and audio synchronization is achieved by resampling the video to match the audio in length.

A normal digital video has about 30 frames per second; so, a 10-second video contains 300 frames. Adding more frames can increase the length of the video. For example, if 150 frames are added in, the original video is now 15 seconds long, and the motion in the video will be slowed by 50%. Normally the new frames are generated by one of the interpolation algorithms. The simplest algorithm is duplicating existing frames or fields (half frame in TV). One such commonly used algorithm is called three-two pull down. That is, converting every 4 frames into 5 frames by reusing one of the frames or two of the fields. A little more complicated method to interpolating frames is blending adjacent frames. The advanced video interpolation algorithms involve accurate pixel based inter-frame motion tracking and prediction.

On the contrary, removing frames can decrease the video length. For example, if 150 frames are removed, the original video becomes 5 seconds long. The motion in the video will be sped up by 100%. Normally the frames are removed by one of the resampling algorithms. The simplest such algorithm is decimation—simply removing a few original frames, though this often causes jitter artifact and makes the motion rough and discontinuous. More involved algorithms use blending two adjacent frames, then replacing the original two frames with this blended frame. The advanced video resampling algorithms utilize accurate pixel-based inter-frame motion tracking and prediction. The tracking information is then used to create new frames at the desired new time locations. The advanced algorithms could be non-linear video processing methods. One example of such video processing software is Adobe Premiere Pro.

In FIG. 1, the input media data has been split into only three segments, but to a person having ordinary skill in the art, the method described can be applied to one, two, four, or any larger number of segments. For example, the input video data can be split into five piecewise segments to be synchronized. However, the number of audio segments must be the same as the number of piecewise segments into which the input video data is split. For example, if there are five input audio segments, the input video data will be split into five corresponding piecewise segments. Through the synchronization process, each of the five input video data pieces will be matched in length to each respective input audio data piece.

In another alternative embodiment of the present disclosure, there can be any number of media data, such as three or four or more, to be synchronized to each other. For example, there could be one video input data and three audio input data, such as voice-over, background music and sound effects for a total of four input media data to be synchronized.

Figure 2:
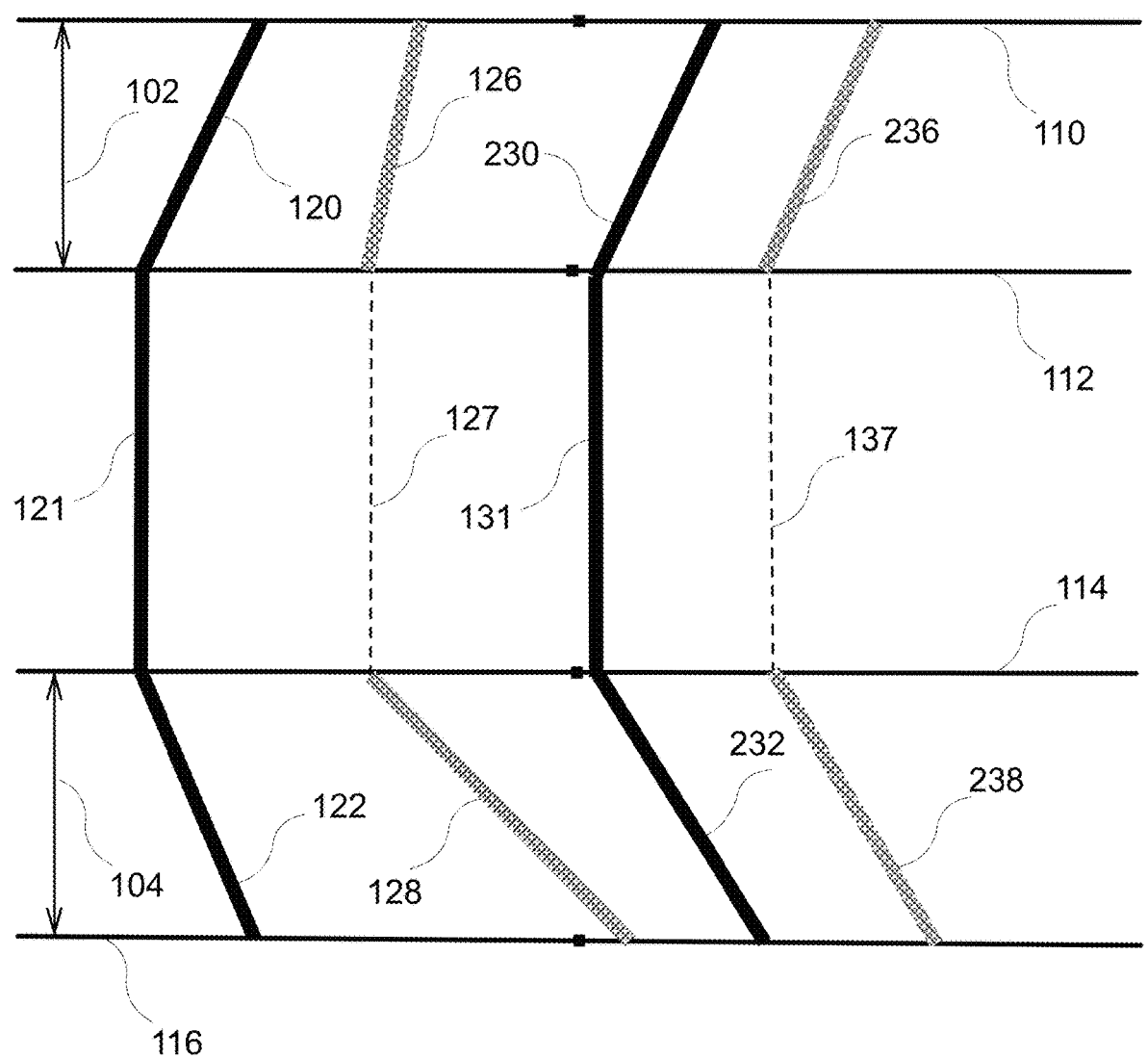
FIG. 2 illustrates an alternative embodiment of the piecewise video and audio synchronization method of the present disclosure.

FIG. 2 illustrates an alternative embodiment of the piecewise video and audio synchronization method of the present disclosure. The situation of the input two media data is exactly the same as that in FIG. 1. As in the exemplary embodiment of the present disclosure, segments (120, 121, 122) are input video data; segments (126, 127, 128) are input voice data. Now in the alternative embodiment of the present disclosure, the video output segments (230, 131, 232) are the same as input segments (120, 121, 122), while the voice segments (236) and (238) are modified to synchronize to the corresponding video segments (230) and (232) respectively. That is, the length of audio segment (236) between the common control line (110) and (112) is adjusted to match the length of video segment (120) or (230); and the length of audio segment (238) between the common control line (114) and (116) is adjusted to match the length of video segment (122) or (232). The input audio segment (127) remains unadjusted because it is silence. It is outputted directly as (137).

Audio retiming can be achieved by changing the audio's pitch, tempo, or speed (both pitch and tempo). For example, a slower tempo of the sound will increase the audio length. A lower pitch of the sound will also increase the audio duration. On the contrary, a faster tempo and higher pitch will decrease the original audio length. Pitch is related to the frequencies of the sound, and tempo is related to the duration of the sound. When speeding up or slowing down a record on a turntable, the pitch and tempo of a track are linked: spinning a disc 10% faster makes both pitch and tempo 10% higher. Software processing to change the pitch without changing the tempo or vice versa is called time stretching or pitch shifting. While it works fairly well for small adjustments (±20%), the result can be noisy and unmusical for larger changes. The advanced algorithms could be non-linear audio processing methods. One example of such software is Audacity.

Figure 3:
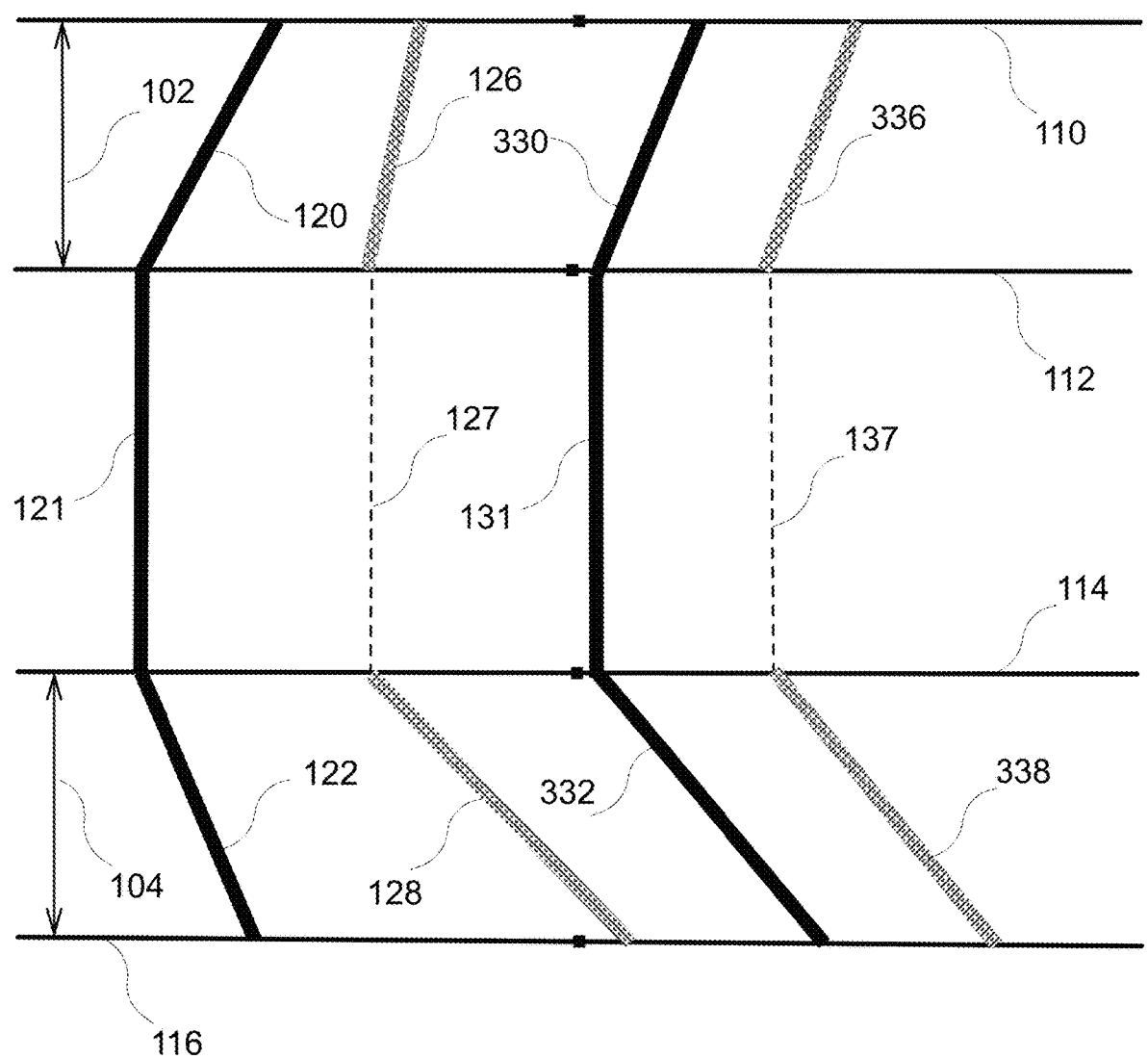
FIG. 3 illustrates a preferred embodiment of the piecewise hybrid video and audio synchronization method of the present disclosure.

FIG. 3 illustrates a preferred embodiment of the piecewise hybrid video and audio synchronization method of the present disclosure. The situation of the input two media data is exactly the same as that in FIG. 1. As in the exemplary embodiment of the present disclosure, piecewise segments (120, 121, 122) are input video data; piecewise segments (126, 127, 128) are input voice data. The video segment (120) and the audio segment (126), which are between the common control line (110) and (112) need to be synchronized in length. The video segment (122) and the audio segment (128), which are between the common control line (114) and (116) also need to be synchronized in length.

Now in this embodiment of the present disclosure, the video input segment (120) is adjusted to an intermediate video length (330). The intermediate length is shorter than the original video length (120), but longer than the original audio length (126). At the same time, the audio input segment (126) is adjusted to an intermediate video length (336). The intermediate length is longer than the original audio length (126), but shorter than the original video length (120). The audio output length (336) matches the video output length (330).

Similarly, the video input segment (122) is adjusted to an intermediate video length (332). The intermediate length is longer than the original video length (122), but shorter than the original audio length (128). At the same time, the audio input segment (128) is adjusted to an intermediate video length (338). The intermediate length is shorter than the original audio length (128), but longer than the original video length (122). The audio output length (338) matches the video output length (32). The input audio segment (127) remains unadjusted because it is silence. It is outputted directly as (137). The input video segment (121) is also unchanged and outputted as (131).

Figure 4:
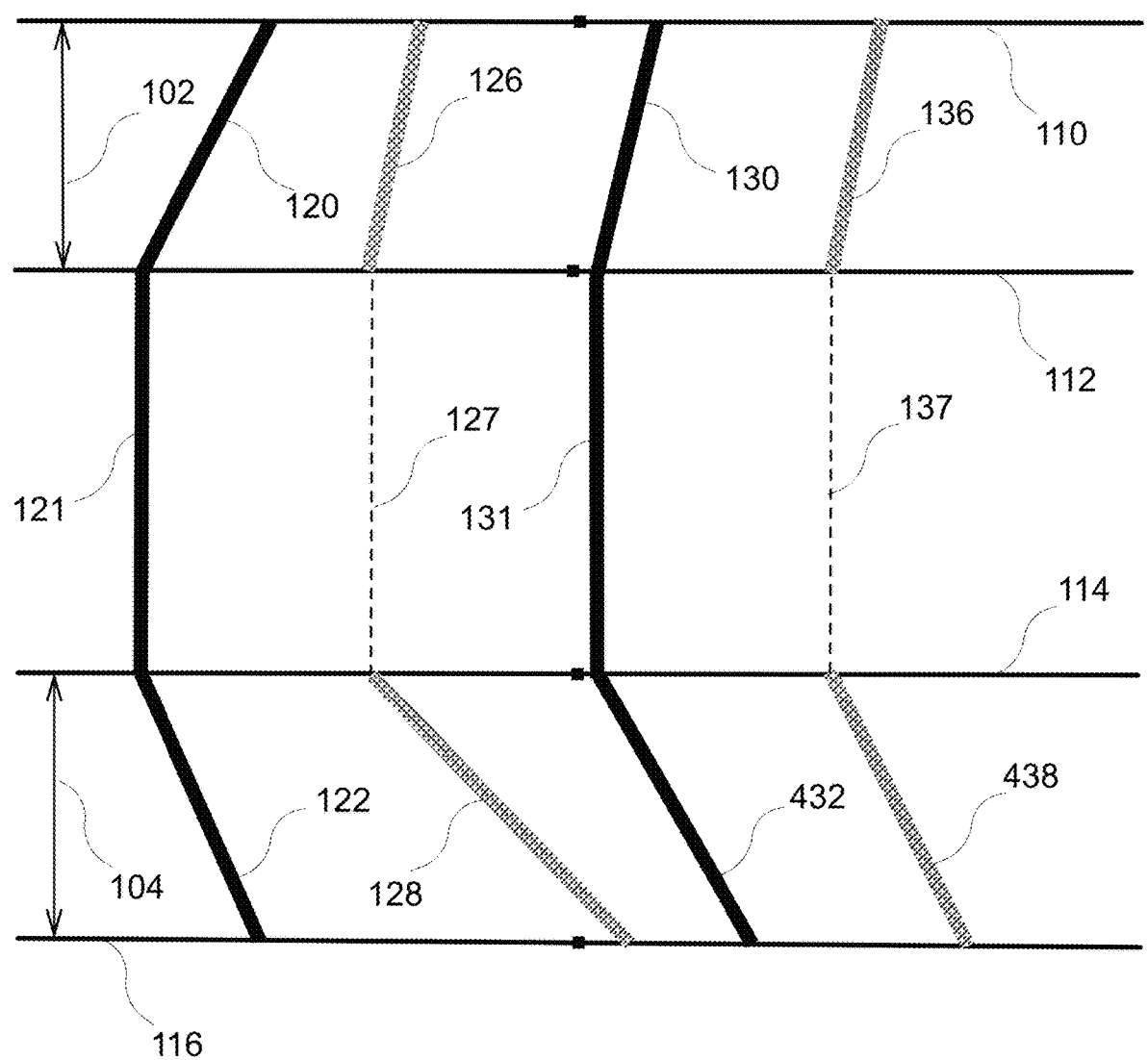
FIG. 4 illustrates an alternative embodiment of the piecewise hybrid video and audio synchronization method of the present disclosure.

FIG. 4 illustrates an alternative embodiment of the hybrid video and audio synchronization method of the present disclosure. The situation of the input two media data is exactly the same as that in FIG. 1. As in the exemplary embodiment of the present disclosure, piecewise segments (120, 121, 122) are input video data; piecewise segments (126, 127, 128) are input voice data. The video segment (120) and the audio segment (126) between the common control line (110) and (112) need to be synchronized in length. The video segment (122) and the audio segment (128) between the common control line (114) and (116) also need to be synchronized in length.

Now in this embodiment of the present disclosure, the synchronization methods are mixed. Between the common control points (110) and (112), the synchronization of the video segment (120) and the audio segment (126) is carried out using the method illustrated in FIG. 1, that is, the video segment (120) is adjusted to match the audio segment (126) in length. The processed video segment is (130) and has the same length as the audio segment (136). While, between the common control points (114) and (116), the synchronization of the video segment (122) and the audio segment (128) is carried out using the method illustrated in FIG. 2, that is, the audio segment (128) is adjusted to match the video segment (122) in length. The processed audio segment is (438) and has the same length as the audio segment (432).

In yet another embodiment of the present disclosure, the synchronization illustrated in FIG. 3 can be also used, besides that in FIG. 1 and FIG. 2. So, any media segment could have more segments defined by the common control point pairs. Each segment can be synchronized using any above described methods; therefore, the hybrid piecewise media data synchronization may contain any combination of the segment synchronization methods.

Figure 5:
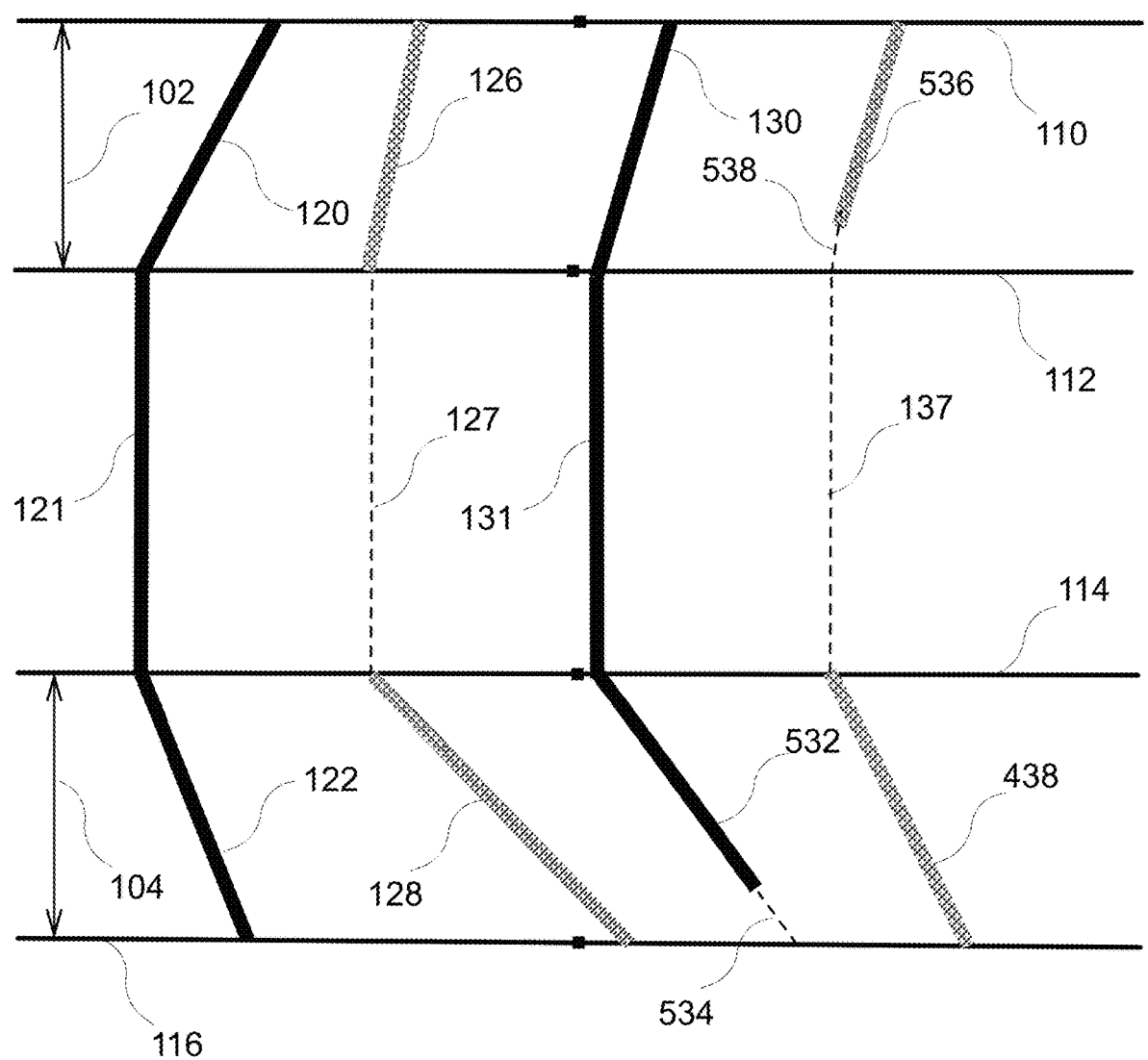
FIG. 5 illustrates an exemplary embodiment variant of the piecewise hybrid video and audio synchronization method of the present disclosure.

FIG. 5 illustrates an exemplary embodiment variant of the piecewise hybrid video and audio synchronization method of the present disclosure. The situation of the input two media data is exactly the same as that in FIG. 1. As in the exemplary embodiment of the present disclosure, piecewise segments (120, 121, 122) are input video data; piecewise segments (126, 127, 128) are input voice data. The video segment (120) and the audio segment (126) between the common control line (110) and (112) need to be synchronized in length. The video segment (122) and the audio segment (128) between the common control line (114) and (116) also need to be synchronized in length.

This embodiment represents a case where both video (120) and audio (126) are to be adjusted to an intermediate media length. When both media data are adjusted, at least one of the media data cannot achieve the target intermediate media length without introducing unacceptable distortion. The media data will be only adjusted with a distortion less than an acceptance threshold in specifications. So, there would be at least one media the length of which is shorter than the desired length. Without loss of generality, between the common control points (110) and (112), the video segment (120) can be adjusted to the target intermediate length as (130) and the change does not need to exceed the pre-defined thresholds; that is, the visual distortion introduced by adjusting the video segment is invisible or tolerable to users. However, the audio segment (126) cannot be adjusted to the target intermediate length as (536) without exceeding the pre-defined thresholds, that is, the aural distortion introduced by adjusting the audio segment is noticeable or unacceptable to users. Therefore, the audio segment (126) can only be adjusted within the thresholds. So, the processed audio segment (536) will be shorter than the desired length. The missing length is (538).

Similarly, between the common control points (114) and (116), the audio segment (128) can be adjusted to the target intermediate length as (438) and the change does not need to exceed the pre-defined thresholds, that is, the aural distortion introduced by adjusting the audio segment is unnoticeable or tolerable to users. However, the video segment (122) cannot be adjusted to the target intermediate length as (532) without exceeding the pre-defined thresholds, that is, the visual distortion introduced by adjusting the video segment is visible or unacceptable to users. Therefore, the video segment (122) can only be adjusted within the thresholds. So, the processed video segment (532) will be shorter than the desired length. The missing length is (534).

FIG. 5 only illustrates one situation in which the hybrid piecewise matching method is used for limiting at thresholds. To a person having ordinary skill in the art, it is also easy to understand that the same limiting situation will happen when other combinations of the matching methods are used too. For example, the video segment is adjusted to match the audio segment; or the audio segment is adjusted to match the video segment.

Figure 6:
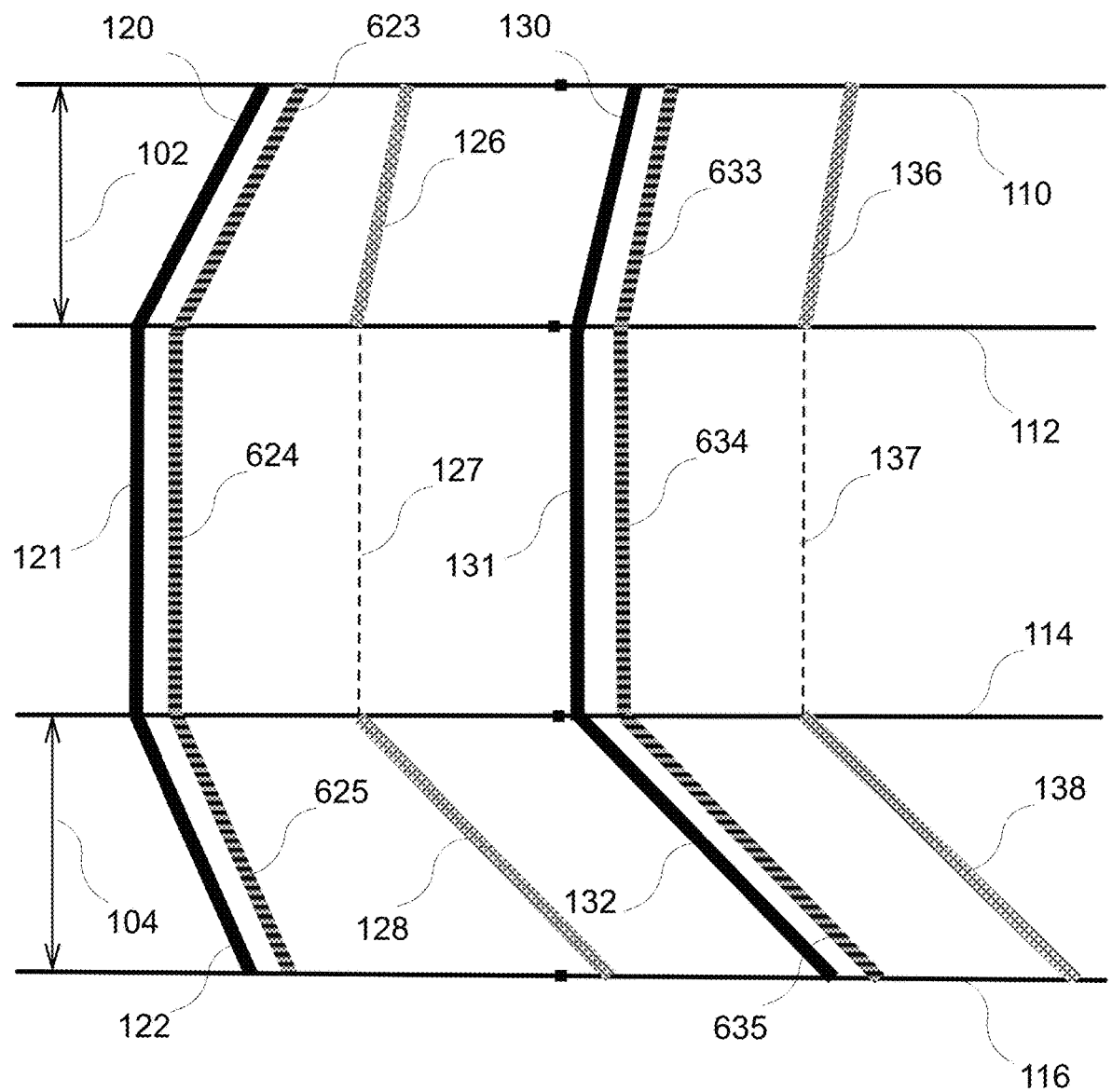
FIG. 6 illustrates an exemplary embodiment of the piecewise video and audio synchronization method of the present disclosure where the original audio is included.

FIG. 6 illustrates an exemplary embodiment of the piecewise video and audio synchronization method of the present disclosure where the original audio is included. The situation of the input two media data is exactly the same as that in FIG. 1. As in the exemplary embodiment of the present disclosure, piecewise segments (120, 121, 122) are input video data; piecewise segments (126, 127, 128) are input voice data. The video segment (120) and the audio segment (126) between the common control line (110) and (112) need to be synchronized in length. The video segment (122) and the audio segment (128) between the common control line (114) and (116) also need to be synchronized in length.

Additionally, an original input audio media data is also split into three piecewise segments (623, 624, 625) defined by pairs of common control points (110, 112, 114, 116). The processed output voice data is also in three piecewise segments (633, 634, 635). In this embodiment of the present disclosure, the original audio segment (623, 624, 625) will always be synchronized with the corresponding video segments. This is relatively easy to achieve because the audio segment (623) will always be the same length as the video segment (120), and the audio segment (634) will always be the same length as the video segment (120, 132). The audio segment (625) will always be the same length as video segment (122, 130). So as seen in FIG. 6, within the common control line (110) and (112), the video segment (120) is modified to match the audio length (126 or 136), and the original audio segment (623) is modified to match the audio length (126 or 136). Within the common control line (114) and (116), the video segment (122) is modified to match the audio length, and the original audio segment (623) is modified to match the audio length (126 or 136).

In this typical embodiment of the present disclosure, the synchronization between the original audio media and the video is relatively easy, because their original lengths are always the same; and their target lengths are always the same as well. In one of the embodiments where the audio segments are adjusted to match the video segments, with the presence of the original audio segments, the new voice segments can optionally be adjusted to match the original audio segments instead of video segments. By changing an audio segment to match another audio segment, one can have more methods to achieve the synchronization. Besides limiting the media length, one can synchronize by content or events. For example, a clap sound in both audio media data; a special sound or voice, etc.

Figure 7:
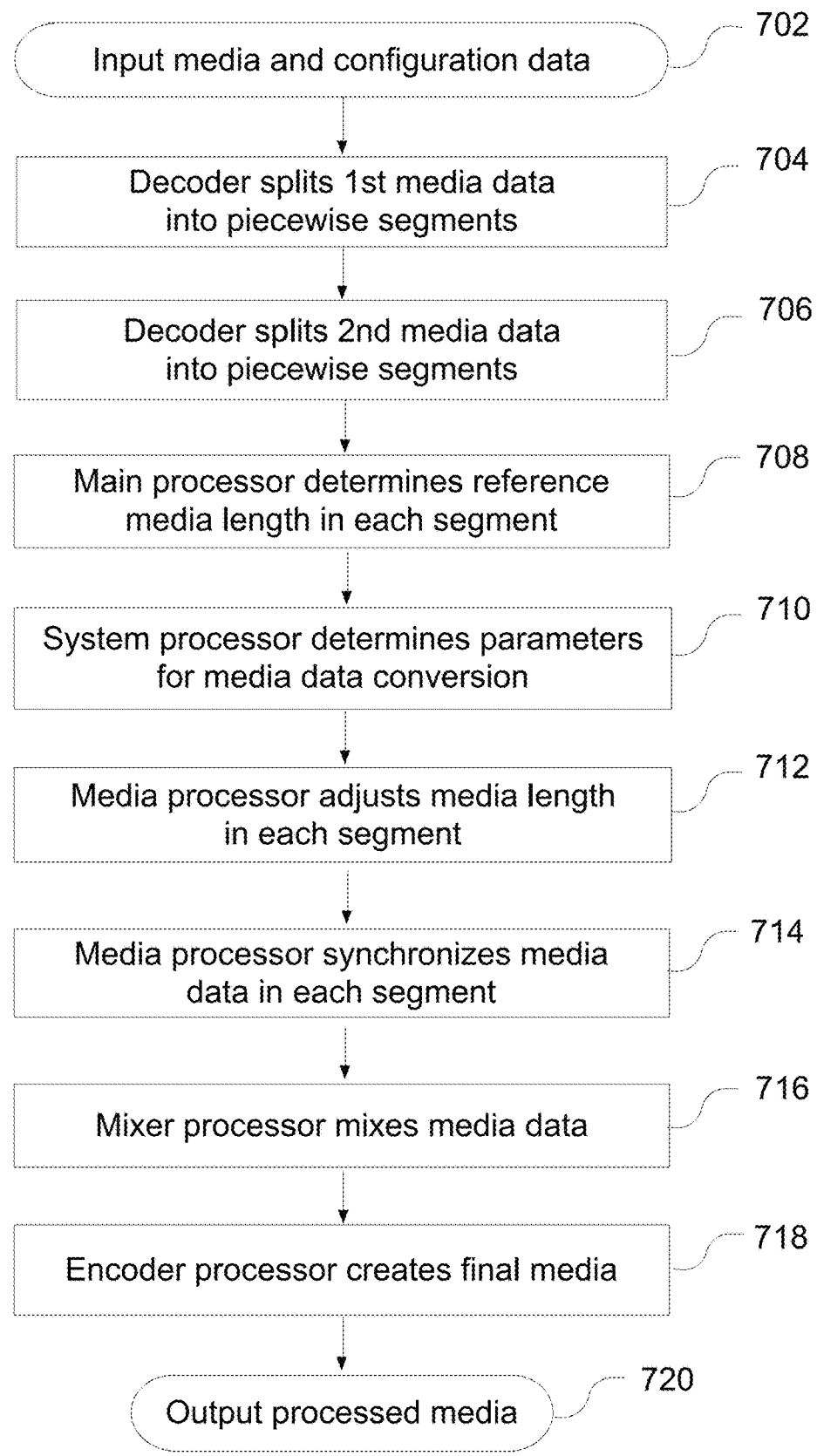
FIG. 7 illustrates a general flow diagram of a preferred embodiment of the video and audio synchronization method of the present disclosure.

FIG. 7 illustrates a general flow diagram of a preferred embodiment of the video and audio synchronization method of the present disclosure. Starting from the block (702), at least two media data are inputted. The configuration data is also inputted. The configuration data contains, but is not limited to, the threshold of the maximum video adjustment, threshold of the maximum audio adjustment, preferred media type for conversion, default media synchronization method, default media data compression ratio, audio mixer parameters' default values, etc.

Figure 8:
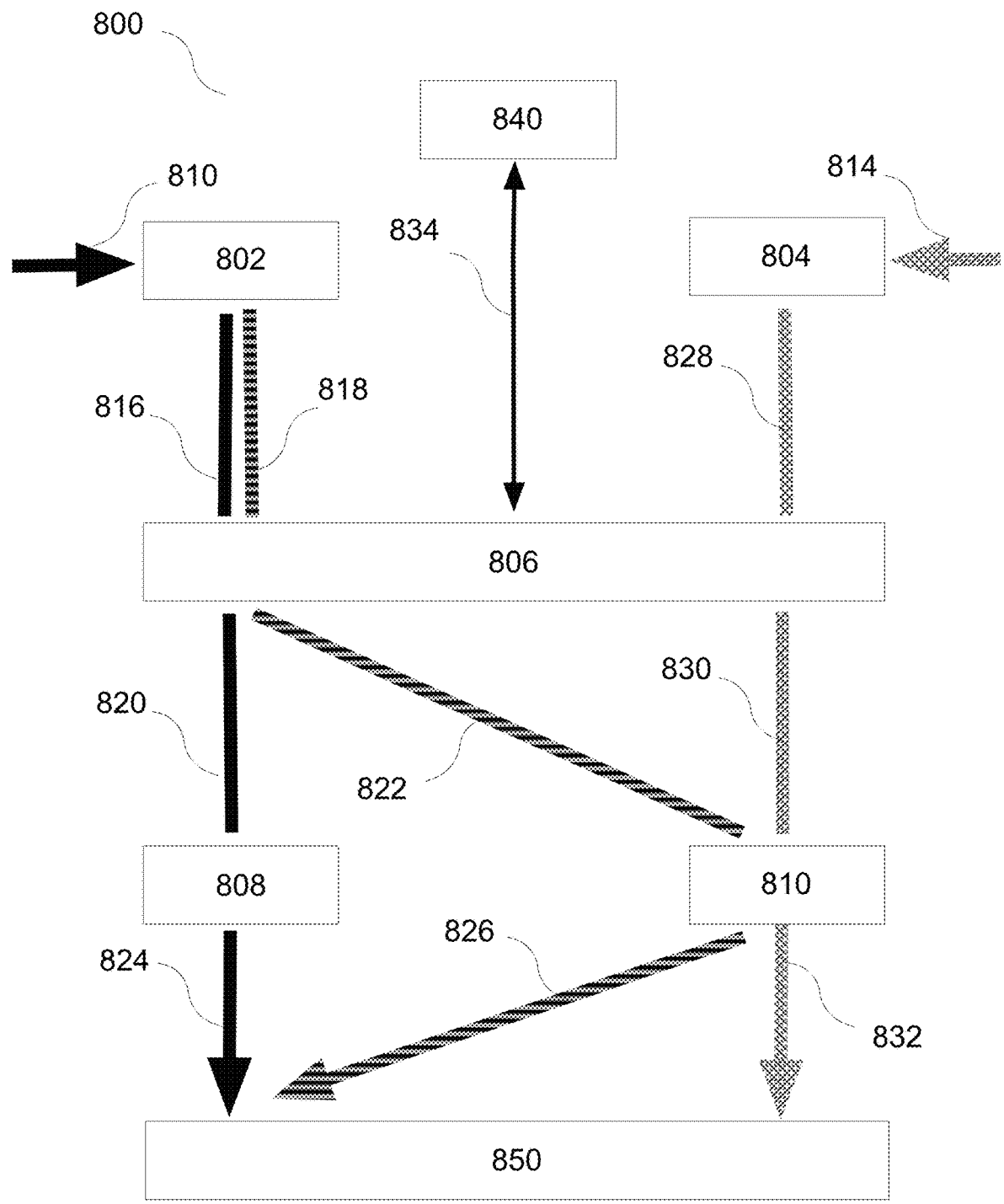
FIG. 8 illustrates an exemplary system design of the video and audio synchronization method of the present disclosure.

In the following description all components mentioned with a cross-reference number beginning with 8 (e.g. decoders 802 and 804) are illustrated in FIG. 8. Decoders (802, 804) receive all the input media data (810, 814) in (704). After decoding the media data, the decoder splits the first media data into a plurality of piecewise segments based on the media content and the configuration data (834). In (706), another decoder splits the second media data into a plurality of piecewise segments based on the media content, the configuration data, and the split segments of the first media data.

Then in step (708), the main processor (806) collects all the information on the inputted media and configuration data and determines the best media conversion method and an optimal target reference media length in each segment. The optimal target reference media length is the final length that all media segments within the pair of common control points that define that segment, should be converted to. The system processor (840) will further determine the parameters for the media data conversion in (710). Besides the optimal target media length, other parameters and operation settings are decided to guide the media conversion to meet the pre-defined specifications and produce high quality synchronization results.

After all the parameters and decisions are made, in block (712), media processors (808) and (810) start to adjust every media segment to match the optimal target length using the determined media conversion method. The matching is carried out in each media segment data bounded by every pair of common control points. Once the lengths are matched, the media processors further shift and 410 process to synchronize all the media data in each segment according to the configuration setup in (714). For example, if a maximum media adjustment threshold is reached, the processed media data will be set to synchronize to the starting timestamp, an inner event, or any other time location.

Once all the media segments are processed and synchronized, a mixer processor (850) may mix several media data to form an output media data in (716). For example, in a project to add translation voice-over onto the existing audio data that includes music and voice in the original language, the two processed audio streams need to be mixed in the mixer processor based on a few pre-defined mixing parameters. The mixed media data and/or unmixed other media data are finally encoded by the encoder to create the final media data in block (718). The final encoded media data is then outputted in the final block (720). So, then the whole piecewise hybrid multiple media data synchronization method of the present disclosure is completed.

The described processing flow in FIG. 7 only serves an exemplary embodiment of the present disclosure. The blocks and ordering do not necessarily have to be as shown. To a person who is ordinarily skilled in the art, some changes to the order of processing steps or blocks, and/or adding or missing some minor related processing steps won't alter the essential idea of the present disclosure. All the steps serve to realize an automatic, intelligent method and system of multiple media synchronization through piecewise segmentation and hybrid linear and non-linear media conversion methods.

FIG. 8 illustrates an exemplary system design (800) of the video and audio synchronization method of the present disclosure. The input packaged media data (810) enters the video decoder (802), which decodes the input data and produces one original video data (816) and one original audio data (818). Normally the video data (816) and audio data (818) have the same length. At the same time, an input voice data (814) enters the audio decoder (804), which decodes the input data and produces an audio data (828). Normally the audio data (828) has a different length than the video (816) and audio (818) data. In one of the embodiments of the present disclosure, the audio data (818) contains music and sound effects with the voice data in the original language. The voice-over data (828) contains the new voice data in the translation language. A control box (840) provides data processing system level parameters and profile data (834). The control box (840) may contain a high-level main processor, like an artificially intelligence (A.I.) model, or machine-learning network. It can also be as simple as an Excel file stored the basic configuration parameters. Specifically, a caption information file (aka subtitle file or closed caption file) can be one of the input system parameter data.

One exemplary embodiment of the present disclosure uses a machine-learning network to make better decisions on the translation voice-over synchronization process. There are certain words or phrases that may appear frequently in a video. For example, "CNN reports" occurs many times in a news video. The machine-learning model can learn this pattern from the previous data and/or custom user adjustments, and know in advance the optimal length and other conversion parameters of this phrase's translation in another target language, so the overall synchronization becomes faster and better.

The generated video data (816), audio data (818), new voice data (828), and system configuration data provided by the control box (840) are all fed into the system processor (806). The system processor (806) carries out all the decision logic of the previously described methods. The system processor (806) also sends pre-processed results back to the control box (840) for higher-level decisions, like A.I., big data, and machine learning. The processor (806) decides which media data should be adjusted and which method and what parameters will be used in the processing. Then the processor (806) outputs the pure video data (820) to a video processor (808). The video processor (808) adjusts the video data length using the decided method and parameters from (806) to generate a processed video data (824). The processed video data (824) could be an elongated or shrunken version of the original video (820). The center processor (806) also directs the original audio data (822) to the audio processor (810). The audio processor (810) adjusts the audio data length using the decided method and parameters from (806) to generate a processed audio data (826). The processed audio data (826) could be an elongated or shrunken version of the original audio (822). The processor (806) also outputs the voice audio data (830) to the audio processor (810). The audio processor (810) adjusts the audio data length using the decided method and parameters from (806) to generate a processed voice data (832). The processed voice data (832) could be an elongated or shrunken version of the input voice audio (830). Finally, all the processed media data, including video data (824), audio data (826), and voice data (832) reach the encoder (850). The encoder (850) encodes all the media data into a final video or movie in one of the standard motion picture compression and packaging formats. One example of such a motion picture compression format is MPEG4.

The above description is specified to one video input and two audio inputs. To a person having ordinary skill in the art, it is trivial to extend the system to have any combination of two, three, or more media inputs. For example, there could be two video inputs; or three audio inputs, etc. The processing logic remains the same.

Each of the aforementioned processors can be a computer, PCB board, or thread of running software module. The processor may contain memory, non-volatile storage, CPU, cluster, database, network, and/or Internet connection. The software running on each processor could be open-source software modules, in-house developed software, or hardware implementation of the algorithms and functions.

What is claimed is:

1. A method of generating synchronized media from digital input data with a first plurality of channels, comprising:

determining the same first plurality of thresholds, one for each of the channels;
  identifying a second plurality of control points indexed in chronological order within each channel, excluding the beginning point of the channel, wherein the content at any control point within a channel is to be synchronized with the content at the control point with the same index within each of the other channels;
  using each channel's control points to partition the channel into the same second plurality of piecewise segments so that each segment starts and ends at a control point except for the first segment, which starts at the beginning point of the channel and ends at the first control point;
  applying a first algorithm to determine the same second plurality of target lengths, one for all segments with the same index across all channels, as well as a set of parameters for each segment;
  applying a second algorithm to modify the data of each segment to match the target length, using the respective set of parameters;
  regenerating each channel by joining the modified segments in the chronological order;
  wherein the content at each control point within any channel occurs at the same time as that across all other channels during media playback;
  wherein the content anywhere within all channels is perceived to be synchronized;
  wherein the perceived quality difference between the modified and original channels is below the threshold determined for the channel.

2. The method of claim 1, wherein the first algorithm is based on a method with machine learning, artificial intelligence prediction model, and neural networks, or a solution to an optimization problem.

3. The method of claim 1, wherein the second algorithm is a linear or non-linear media data conversion method.

4. The method of claim 1, wherein the input data are decoded from a media stream file, and the generated media data are encoded into another media stream file.

5. The method of claim 1, wherein the full processing is automatic.

6. The method of claim 1, wherein at least one of the generated channels is from mixing at least two synchronized channels.

7. The method of claim 1, wherein the control points are searched for and identified by human selection, clapboard, or other AV interactive methods.

8. The method of claim 1, wherein one of the channels is a video, and another channel is audio.

9. The method of claim 8, wherein the second algorithm includes interpolating, decimating, or resampling frames for video, and changing samples' pitch, tempo, or speed for audio.

10. The method of claim 8, wherein the video is unchanged, and the audio is modified to match the video in time.

11. The method of claim 8, wherein the audio is unchanged, and the video is modified to match the audio in time.

12. The method of claim 8, wherein both the video and audio are modified to match a different length in time.

13. The method of claim 8, wherein at least one video segment is modified to match an audio segment, and at least one audio segment is modified to match a video segment.

14. The method of claim 1, wherein there is at least one segment that cannot be synchronized within the threshold, so truncation is applied if the original length is longer than the target length or the blank is filled if the original length is shorter than the target length.

15. An apparatus for automatically synchronizing at least a first stream of media data with a second and outputting a third, comprising:

a decoder that decodes a video channel and a first audio channel from the first stream of media data and a second audio channel from the second stream of media data;

a control module that stores settings and parameters and determines at least three thresholds, one for each of the channels;

a processor that identifies at least a first, second, and third control point within each of the video, first audio, and second audio channels;

wherein all the first control points are to be synchronized in time across all the channels; as are all the second and third control points;

wherein the processor partitions each of the three channels into at least a first and second piecewise segment, wherein the first segment starts at the channel's first control point and ends at the channel's first control point; the second segment starts at the channel's second control point and ends at the channel's third control point;

wherein the processor uses an algorithm to determine a first target length for all the first segments across all channels; a second target length for all the second segments across all channels; and a set of parameters for each of the segments;

a video processor that modifies each video segment to match the target length with the set of parameters and settings, joins the first and second processed segments, and generates a processed video channel;

an audio processor that modifies each audio segment to match the target length with the set of parameters and settings, joins the first and second processed segments in each channel, and mixes the synchronized first and second audio channels into a processed audio channel;

an encoder encodes the processed video and audio channels into the third stream of media data;

wherein the content at each control point within any channel occurs at the same time as that across all other channels during media playback;

wherein the content anywhere within all channels is perceived to be synchronized;

wherein the perceived quality difference between the modified and original channels is below the threshold determined for the channel.

16. The method of claim 15, wherein the algorithm is based on a machine-learning and artificial-intelligence prediction model or network.

17. The method of claim 15, wherein the control points are searched for and identified by manual or automatic digital signal processing.

18. The method of claim 15, wherein the video processor uses a linear or non-linear method of interpolating, decimating, or resampling frames and the audio processor uses a linear or non-linear method of changing samples' pitch, tempo, or speed.

19. The method of claim 15, wherein the first audio channel is void.

20. The method of claim 15, wherein at least one segment cannot be synchronized within the threshold, so truncation is applied if the original length is longer than the target length, or the blank is filled if the original length is shorter than the target length.

* * * * *